United States Patent [19]

New

[11] 4,393,457
[45] Jul. 12, 1983

[54] METHOD AND APPARATUS FOR SEQUENCING ADDRESSES OF A FAST FOURIER TRANSFORM ARRAY

[75] Inventor: Bernard J. New, Los Gatos, Calif.

[73] Assignee: Advanced Micro Devices, Inc., Sunnyvale, Calif.

[21] Appl. No.: 247,676

[22] Filed: Mar. 26, 1981

[51] Int. Cl.³ ............................................. G06F 15/34
[52] U.S. Cl. .................................... 364/726; 364/200
[58] Field of Search ...................... 364/726, 200, 900

[56] References Cited

U.S. PATENT DOCUMENTS

| | | | |
|---|---|---|---|
| 3,591,784 | 7/1971 | Cutter et al. | 364/726 |
| 3,601,592 | 8/1971 | Cutter et al. | 364/726 |
| 3,673,399 | 6/1972 | Hancke et al. | 364/726 |
| 3,871,577 | 3/1975 | Avellar et al. | 364/726 |
| 4,117,541 | 9/1978 | Ali | 364/726 |
| 4,138,730 | 2/1979 | Ali | 364/726 |

OTHER PUBLICATIONS

Moyer, "A High-Speed Indexing Unit for FFT Algorithm Implementation", *Computer Design*, Dec., 1971, pp. 45-48.

*Primary Examiner*—David H. Malzahn
*Attorney, Agent, or Firm*—Gary T. Aka; J. Ronald Richbourg

[57] ABSTRACT

An apparatus and method for generating a specific sequence of addresses of values of an array stored in a digital memory. The addresses are generated by a first counter which generates a seed value and a second counter which generates a control value, the control value controlling a bit inserter and a programmable shifter to set, respectively, the bit place position of bit insertion and the amount of shift. The output of the bit inserter is the row position of related addresses for butterfly operation of a fast Fourier transform array. The output of the shifter is the address of coefficients associated with the complex rotation of the butterfly operation. The apparatus is an integrated circuit intended for use as a modular integrated circuit in connection with digital memory means and central processing means including a digital multiplying means.

13 Claims, 4 Drawing Figures

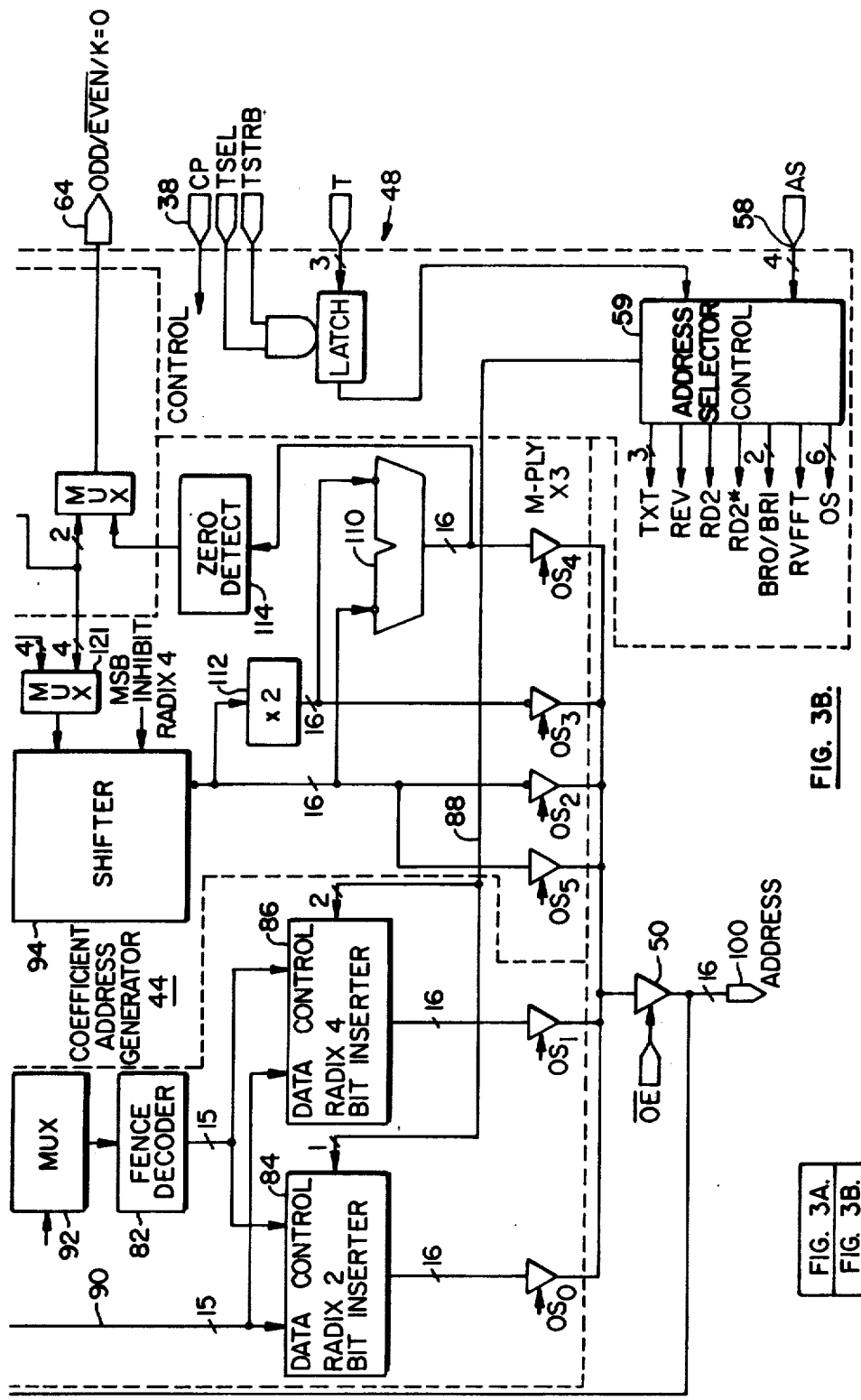

METHOD AND APPARATUS FOR SEQUENCING ADDRESSES OF A FAST FOURIER TRANSFORM ARRAY

BACKGROUND OF THE INVENTION

1. Field of Invention

This invention relates to digital signal processing and more particularly it relates to methods and apparatus for generating the necessary address sequences for performing butterfly functions of various transforms known collectively as fast Fourier transforms (FFT) for a preselected number of points. The class of processes generally known as discrete Fourier transforms (DFT) relates to signals stored at least temporarily in sampled digital form in a digital memory.

Fast Fourier transforms are a class of processes which are capable of performing Fourier transformation of signals with considerably fewer multiplication operations than normally is required for Fourier transformation. For example, direct evaluation of a discrete Fourier transform on N number of points requires $N^2$ complex multiplications and additions. A fast Fourier transform requires only $(N/2) \log_2 N$ number of computations. For an N equal to 1024 points, this represents a computational savings of 99 percent.

There are two classes of fast Fourier transforms, decimation in time and decimation in frequency. Each class has many modifications. The fast Fourier transform is characterized by a large number of repetitive sequential multiplications of complex numbers (i.e., having real and imaginary parts) in short loops.

2. Description of the Prior Art

In the past, the identification of the particular points to be operated on in an FFT has generally required the generation of an address sequence locked into the size of the specific transform to be performed. Various computer program-implemented schemes are known which are generally so slow as to preclude real time applications. Hence, means for generating the address sequence for relatively high-speed applications have heretofore been essentially fixed discrete hardware implementations. What is needed is an address sequencer for generalized applications capable of generating addresses of stored data of essentially any modification of the classes of fast Fourier transforms for use in high-speed, e.g., real time, applications.

Hardware FFT address sequence generator structures are known for generating FFT addresses of arbitrary size. One prior art address generator, for example, has been suggested for use by TRW of Los Angles, Calif. in connection with its high-speed multipliers. The address sequencer comprises approximately a dozen individual components, including a complex array of various counters, multiplexers and index generating circuits. What is desired is a technique for address sequencing which can be incorporated into an apparatus as a single integrated circuit.

SUMMARY OF THE INVENTION

According to the invention, an integrated circuit apparatus and method are provided for sequentially generating values to act as indices to positions in an array which in turn are convertable directly to addresses in a digital memory. A first counter generates a seed value and a second counter generates a control value, the control value controlling a bit inserter and a programmable shifter to set, respectively, the bit place position of bit insertion and the amount of shift in the seed value to designate a row position in a column array. The output of the bit inserter is the sequence of values representing array location for complex number operands of a butterfly function of a fast Fourier transform array. The output of the shifter is the row position in a column array for coefficients associated with the complex rotation of the butterfly function. Address selection means connected to an external source use the position values to address the specific location in the array established by the address selector of the invention.

The apparatus is intended for use as a modular integrated circuit in connection with digital memory means and central processing means including a digital multiplying means.

The address sequencer apparatus according to the invention is useful in a digital computer fast Fourier transform processor having a user-preselectable number of evaluation points.

A specific embodiment of the invention is an address sequencer which can generate data and coefficient addresses for arrays of 2 points to 65,536 points employing a variety of fast Fourier transform algorithms, including combinations of radix-2 or radix-4, decimation in time or decimation in frequency, in place, bit reversing input or output, and real value or complex value input. The apparatus according to the invention is capable of generating any and all data and coefficient addresses necessary to perform any one of the types and sizes of fast Fourier transforms.

The invention will be better understood by reference to the following detailed description taken in connection with the accompanying drawings.

BRIEF DESCRIPTION OF THE DRAWINGS

FIG. 3B is a detailed block diagram of a second portion of a fast Fourier transform address sequencer according to the invention.

DETAILED DESCRIPTION OF SPECIFIC EMBODIMENTS

Figure 1:
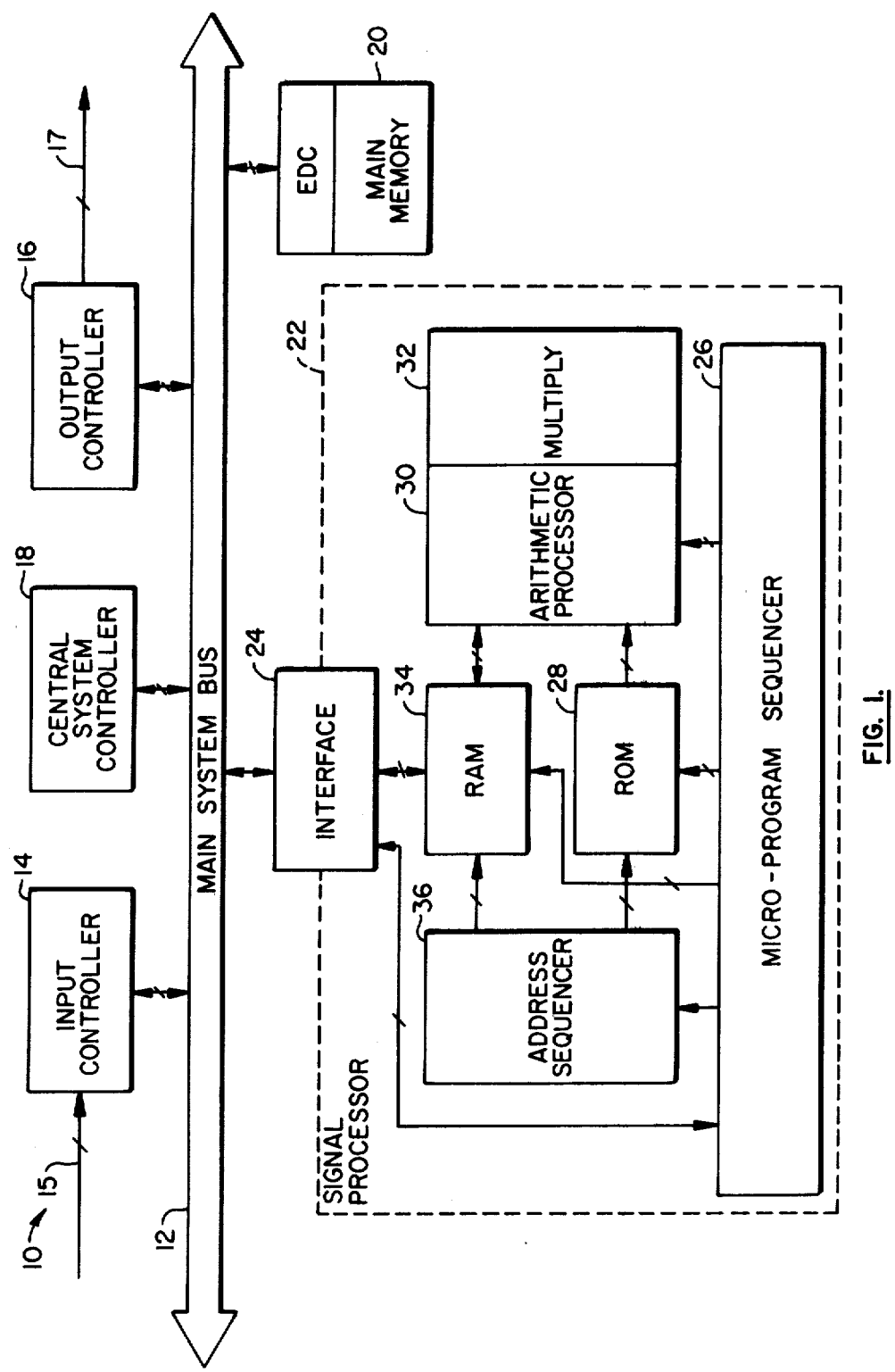
FIG. 1 is a block diagram of a digital computer system to which is coupled a signal processing system.

The invention is intended for use as an address sequencer for a fast Fourier transform (FFT) processor which processes signals in digital form. One representative environment is a computer system 10 (FIG. 1). In the computer system 10, there is typically a main system bus 12 which interconnects various system elements. Typical system elements are an input controller 14, with its associated input devices (not shown) fed by a suitable connection 15, an output controller, with its associated output devices (not shown) coupled out by an associated connection 17, a central system controller 18, which incorporates the central processing unit, and a main memory 20, with its control interface.

According to the invention, there is at least one device, such as a signal processor 22, which is coupled to the main system bus 12 having a special function. The signal processor 22 may for example perform fast Fourier transforms in response to a specific instruction signal applied to the system bus 12.

An interface 24 interconnects the signal processor 22 with the main system bus 12 and provides all necessary data, address and control information transfer functions for the signal processor 22. The signal processor 22 may itself be a small special purpose computing machine which is capable of rapidly generating digital signals representative of the results of its special purpose computation.

The signal processor 22 typically includes a microprogram sequencer 26, a read only memory (ROM) 28, an arithmetic processor 30 with a dedicated multiply function device 32, a random access memory (RAM) 34 and an address control device or an address sequencer 36.

The microprogram sequencer 26 is coupled to the interface 24, the address sequencer 36, the ROM 28, the RAM 34 and the arithmetic processor 30. The microprogram sequencer 26 provides the instructions, initial parameters and clock to the address sequencer 36 and to the other devices of the signal processor 22, generally in the form of microcode. The ROM 28 contains data representing at least a portion of the constants used in the signal processor 22. The RAM 34 is for storage of input and output data and for so-called "scratch pad" storage of data generated during computation. The RAM 34 is coupled to the address sequencer 36, to and from the interface 24, and to and from the arithmetic processor 30. The arithmetic processor 30 is preferably a dedicated special purpose central processing unit comprising one or more arithmetic logic units, multiplexers and sufficient parallel input and output connections to handle relatively large word size addresses and data of the type appropriate to signal processor applications. One such processor is the AM2903 Microprogrammable Processor, a bit-slice device manufactured by Advanced Micro Devices, Inc. of Sunnyvale, Calif. Other register-ALU bit-slice devices may be used alone or in combination having characteristics further optimized for the specific application.

Figure 2:
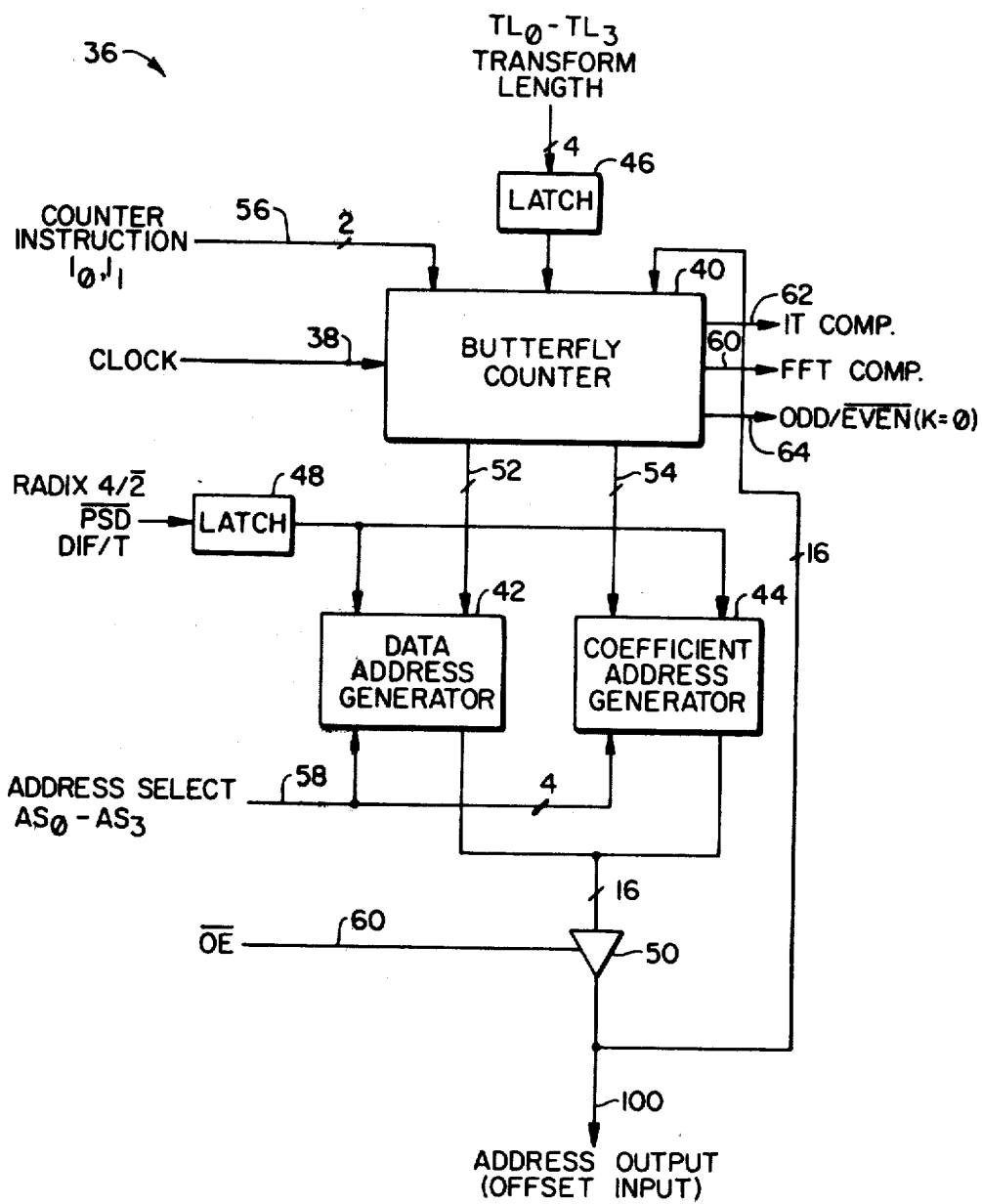
FIG. 2 is a block diagram of a fast Fourier transform address sequencer according to the invention.

Referring to FIG. 2 there is shown a block diagram of the address sequencer 36 according to the invention. It comprises three principal elements, namely, a butterfly counter 40, a data address generator 42, and a coefficient address generator 44. In addition, there is provided a first latch 46 and a second latch 48, and also means for enabling the address output, herein called an address gate 50.

It is the function of the address sequencer 36 to receive a set of instructions and parameters about the fast Fourier transform to be processed and to generate, as an address output in proper sequence, all of the addresses needed for memory operations of a fast Fourier transform of a preselected length.

The FFT memory operations include what is called a butterfly operation. The butterfly operation is applied repeatedly to the set of input data to form an intermediate set of data. The butterfly operation is then applied repeatedly to the intermediate data set but under a different ordering. This process is iterated until the transform is complete. The repeated butterfly operation may therefore be considered to form a two-dimensional array in which each row represents a point in the array and each column represents a step in the process.

For a more complete discussion of the FFT, reference is made to a textbook on digital signal processing, such as *Theory and Applications of Digital Signal Processing*, by Rabiner and Gold, 1975 Bell Telephone Laboratories.

In order to understand the types of addresses to be generated, it is helpful to understand something about the typical fast Fourier transform. A fast Fourier transform can be defined in terms of a one-dimensional array of complex numbers in the form:

$$A = X + jY$$

where
X is the real portion,
Y is the imaginary portion, and
j is the square root of $-1$ ($\sqrt{-1}$).

One of the processes involved in the operation is called a complex rotation. The complex rotation is often referred to in terms of its variable or coefficient value k in the expression for W:

$$W_N^k = e^{\frac{-j2\pi k}{N}}$$

where
e is the exponential function; and
N is the total number of points in the transform sample.

The coefficient values k are based on the relative positions of the complex data values in the operations on the array. A typical operation of an FFT involves retrieving the addresses of two (radix-2) or four (radix-4) specific data points in the address of the related coefficient value, and processing the data and coefficient values in a memory point exchange, i.e., in a so-called "butterfly" operation. One specific radix-2 butterfly operation is as follows:

A' = A + B or the first butterfly product;
B' = (A − B)$W_N^k$ or the second butterfly product;
Store A' and B' in the memory cells of B and A respectively.

It should be noted that the data values A and B are complex numbers and therefore two data cells are required for each complex number.

It is thus necessary to know three addresses to perform five complex memory operations for each butterfly operation, namely, A (A'), B (B') and the address of $W^k$ (which is k) noting that both real and imaginary parts must be stored and retrieved.

The address sequencer 36 according to the invention (FIG. 2) is intended for use with a transform processor for a preselectable number of points. Accordingly, four bits of input are provided to the first latch 46 to specify the transform length. The output of the first latch 46 is coupled to the butterfly counter 40 to select the length of the array.

A simple relationship exists between the addresses of an FFT array in each step of the process. The relationship is apparent only when the positions of each operand are examined in binary form in a two-dimensional array of the process. For example, each array is a subset of a larger array, and the array positions of the input and output of each parallel process are in a sequence, except for only one bit of the value of the array position. According to the invention, this one bit is manipulated to obtain the proper row positions of each column or series of operations.

The following example is offered to illustrate how an address sequencer may be manipulated. Each sample in a sequence may be represented by its position or row address within a column or series of an FFT. For an eight-point FFT with data X0, X1, X2, X3, X4, X5, X6, X7 (where the subscripts represent the addresses), there are four "rows" or pairs for the butterfly process. In a bit reverse input (BRI) type FFT, column 0, row 0 comprises pair X0 and X4, row 1 comprises pair X1 and X5, row 2 comprises X2 and X6, and row 3 comprises X3 and X7. Further, column 1, row 0 comprises pair X0' and X2', row 1 comprises pair X1' and X3', row 2 comprises X4' and X6', and row 3 comprises X5' and X7'. Further, the last column, column 2, in row 0 comprises pair X0" and X1", row 1 comprises pair X2" and X3", row 2 comprises pair X4" and X5", and row 3 comprises pair X6" and X7".

The entire process can be performed using just eight complex address locations by writing the processed values into the address locations of the previous pairs. This storage scheme saves a considerable amount of storage space. For example, the first butterfly product is stored in the second memory cell of the pair, and the second butterfly product is stored in the first memory cell of the pair. When an entire array has been constructed and the binary addresses of the memory cells at each point in the operation are analyzed and compared, a curious characteristic is discovered: If one bit of each address at the same position in each column is omitted, the address for each row position is the same throughout the row, and the row addresses are related sequentially. The one bit, if isolated, is really a column of bits which is invariant through the entire sequence. The position of the bit propagates between the least significant bit and the most significant bit in a direction depending on the bit order at the input and the output.

This characteristic can be seen from an examination of Table I in which each address of each data value in an eight-point FFT array is shown in both its decimal and binary form. An asterisk (*) has been placed over the column of binary numbers which are identical in each column of addresses:

TABLE I

| Column → Row ↓ | | 0 Decimal/Binary | 1 Decimal/Binary | 2 Decimal/Binary |
|---|---|---|---|---|
| 0 | A | 0/0̇00 | 0/0̇00 | 0/0̇00 |
| | B | 4/1̇00 | 2/0̇10 | 1/0̇01 |
| 1 | A | 1/0̇01 | 1/0̇01 | 2/0̇10 |
| | B | 5/1̇01 | 3/0̇11 | 3/0̇11 |
| 2 | A | 2/0̇10 | 4/1̇00 | 4/1̇00 |
| | B | 6/1̇10 | 6/1̇10 | 5/1̇01 |
| 3 | A | 3/0̇11 | 5/1̇01 | 6/1̇10 |
| | B | 7/1̇11 | 7/1̇11 | 7/1̇11 |

The address sequence in Table I is in each case the binary representation of the row number with a bit inserted, as indicated by the starred column. The inserted bit is employed to generate an index for the address position in that row position in that row position differentiating between operands. The columns are distinguished by inserting the bit in a different bit order position. A matrix of any size could be represented by extending the rows and column vertically and horizontally.

There is a similar regularity in the relationship of the coefficient addresses, if properly analyzed. Each coefficient value represents a fractional rotation in a complex plane defined by coefficient index k. In an eight-point FFT, for example, three columns of bits may be used to represent the corresponding fractions of a half cycle rotation. In this case, however, analysis of the binary equivalents reveals that the sequentially related columns of binary numbers defining the addresses are simply shifted from least significant bit to most significant bit and then truncated at the value exceeding the radix. Table II illustrates row and column positions of a fractional one-half cycle rotation for an eight-point FFT. The decimal number in the column represent eighths of a whole number. The binary equivalent is actually a row number of binary constants which is shifted toward the most significant bit and truncated at the radix.

TABLE II

| Coefficient Column → Row ↓ | 0 Decimal/Binary | 1 Decimal/Binary | 2 Decimal/Binary |
|---|---|---|---|
| | T\| * | T\| * | T\| * |
| 1 | 0/0.00 | 0/0.00 | 0/00.00 |
| 2 | 1/0.01 | 2/0.10 | 0/01.00 |
| 3 | 2/0.10 | 0/1.00 | 0/10.00 |
| 4 | 3/0.11 | 2/1.10 | 0/11.00 |
| | .R₁R₀ | R₁.R₀0 | R₁R₀.00 |

Turning to FIG. 2, the butterfly counter 40 is shown to have two outputs, a first output 52 and a second output 54. The first output, which provides both row and column position counts, is a bus coupled to the data address generator 42 and the second output, which also provides both row and column position counts, is a bus coupled to the coefficient address generator. The function of the butterfly counter is to provide sequential column and row counts. The unmodified row position counts are termed seed values. The column position counts are termed control values. The butterfly counter 40 is a programmable counter set which is responsive to a 2-bit-wide counter instruction $I_0$, $I_1$. The counter instructions through instruction decoder 56 are decoded to the internal instructions Reset Row, Load Row, Reset Column, Load Column and Count Enable. The instructions (exclusive of Count Enable) define the initial conditions for the butterfly counter 40. A clock input 38 is coupled to the butterfly counter 40. The butterfly counter 40 has three flag outputs, namely, Fast Fourier Transform Complete 60, Inverse Transform Complete 62, and Odd/Even/k=0 (64). (Flag 64 is a multiplexed flag, as will be seen from FIG. 3B.)

The transform length is preselectable through latch 46 for typically the following transform lengths: 2, 4, 8, 16, 32, 64, 128, 256, 512, 1024, 2048, 4096, 8192, 16384, 32768, and 65536.

The second latch 48 is used to receive and to store the instructions on a preselected type of fast Fourier transform. These include radix-2, radix-4, prescrambled data (bit reversed input or bit reversed output), decimation in frequency and decimation in time. The output of second latch 48 is directed to the data address generator 42 and to the coefficient address generator 44.

A 4-bit address select input is also provided to specify sixteen ways to interpret the address out of the data address generator or coefficient address generator. In response to the address select input values, the data address generator 42 and the coefficient address generator 44 convert the row count to the value specifying the corresponding address location in RAM or ROM. The output of the address generators 42 and 44 are multiplexed onto a single 16-bit bus and provided as an address output to the ROM 28 and the RAM 34 (FIG. 1). The address is called up as needed through a control line output enable 60 through the output address gate 50. The address output of the output address gate 50 is coupled back to the butterfly counter 40 to permit the output terminal to be employed as an input to the butterfly counter 40. In this manner, unused bits of greater significance than employed for counting may be loaded into the butterfly counter to be propagated through the address generators 42 and 44.

Figure 3A:
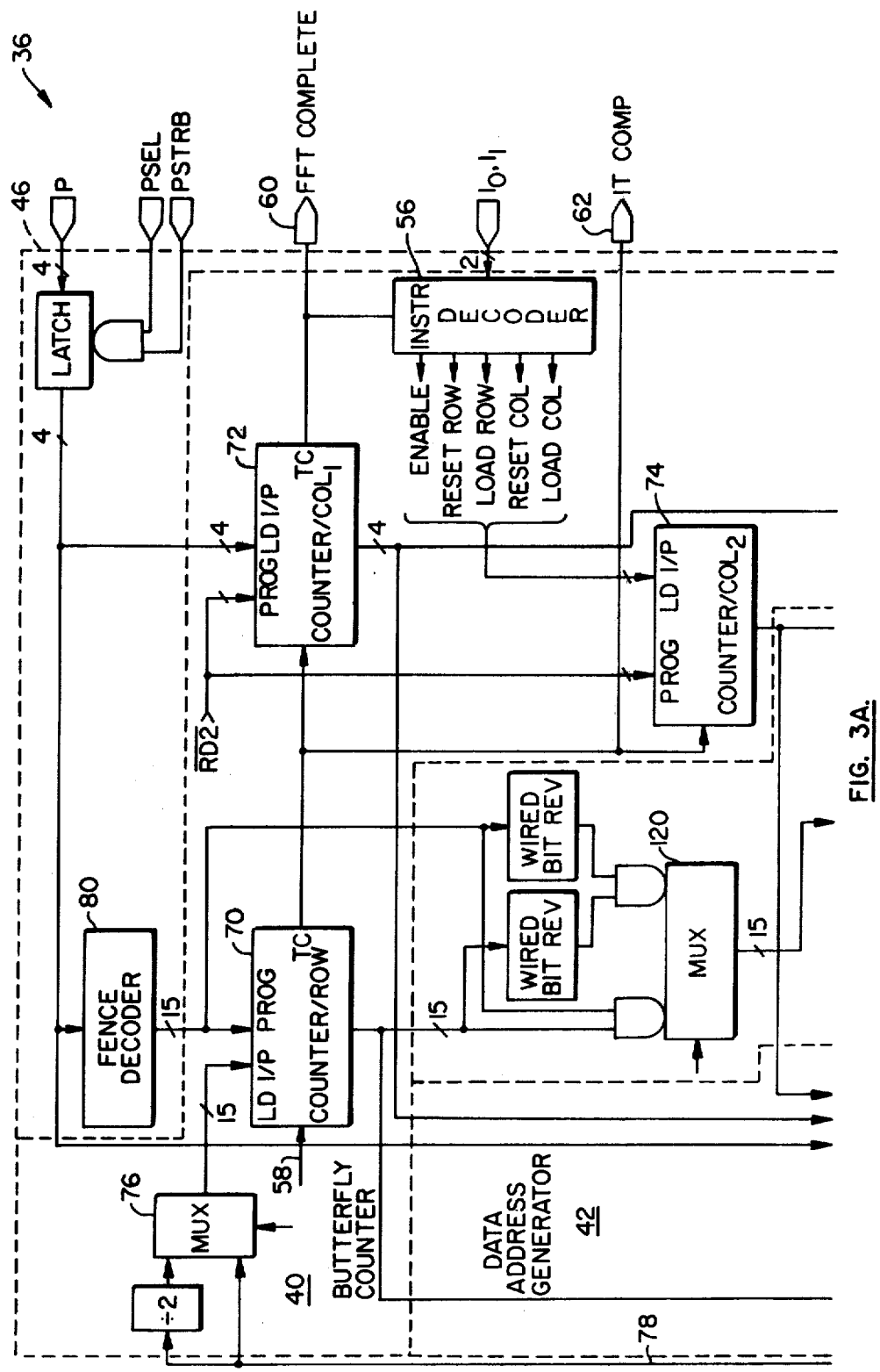
FIG. 3A is a detailed block diagram of a first portion of a fast Fourier transform address sequencer according to the invention.

Turning now to FIGS. 3A and 3B, there is shown a schematic diagram of the address sequencer 36. It provides a description of all functions necessary to generate the row and column counts specified by Table I and Table II for an FFT array.

Turning to FIG. 3A, the butterfly counter 40 comprises a row counter 70, a first column counter 72, and a second column counter 74. A multiplexer 76 is employed in the feedback line from the address output 78 to select between radix-2 and radix-4 modes of operation. The address sequencer 36 includes a first fence decoder circuit 80 and a second fence decoder circuit 82. The two fence decoder circuits 80, 82 are operative to convert a 4-bit code into a corresponding 15-bit binary number comprising chains of zeros and ones where the place position of the zero to one transition corresponds to the 4-bit value of the input binary number. That place position is hereafter called the transition point. The fence decoder circuits 80 and 82 enable the efficient generation of counts, thereby saving both time and space in the device.

The counters 70, 72, 74 of the butterfly counter 40 are operative to incrementally count the column or row positions within a fast Fourier transform array. For example, the output of the row counter 70 is preset to the first row position and then incremented through all rows of the array. Once it has reached its carry, it resets itself and increments the clock input of the column counter 72. The cycle continues until the column counter 72 is incremented to its carry value, whereupon it issues a carry signal to the output 60 thereby signaling that the FFT is complete. The second column counter 74 is provided as a convenience for counting columns from a different initial value.

The row counter 70 is generally preset to start at 0 and is constrained to carry at the value corresponding to the highest number of rows in the array to which it is programmed, as defined by the latch 46. For an 8-bit array, for example, the row counter 70 counts repeatedly between 0 and 3 whereupon it issues a carry signal and is reset. The column counter 72, on the other hand, is generally preset to a value equal to the maximum design size of the FFT array, less the number of columns of the array. For example, for an eight-point FFT a column counter capable of counting one through sixteen columns (numbered 0 through 15) is preset to the number 13 so that it increments 13, 14, and 15. Whereupon it issues its carry signal and is reset to 13.

A key to the invention is a bit inserter 84 or 86. The first bit inserter 84 is designed for operation in a radix-2 environment. The second inserter 86 is intended for operation in a radix-4 environment. According to the invention, bit inserter 84 (86) is operative to insert a control bit (control bits) via line 88 in a binary seed address value from a data bit line 90 out of the butterfly counter 40 at a position specified by the position of the transition between zeros and ones out of fence decoder 82 applied to a control input of the bit inserter 84 (86). The position of the inserted bit (radix-2) or inserted two bits (radix-4) is determined solely by the position of the boundary between zeros and ones. The position of the boundary between zeros and ones is strictly a function of the output of fence decoder 82. A multiplexer 92 having at least two inputs, an input from the output of the first column counter 72 and an input from the second column counter 74, specifies the information necessary to provide the control for inserting the control bit (or bits) at the bit place position. The specific control bit inserted is chosen to differentiate the row position of the particular one of the butterfly pair (A or B) operands in the butterfly operation. As will be noted from an examination of Tables I or II, the control bits for a radix-2 multiplication is simply zero or one depending on whether the position of the A data or the position of the B data is desired. The address corresponding to the row position is generated by the row counter output fed by data line 90 to the bit inserter and by instruction bits of the address select control 59. The bit inserter 84 (86) is operative to pass the portion of the seed value aligned with the zeros through the device, to shift the portion of the seed value lining up with the ones (by one bit if radix-2 and two bits if radix-4) toward the most significant end, and to insert at the transition point the control bit (or bits) from line 88 to generate an output value. The output of the bit inserter 84 (86) is the output of the row counter 70 with a portion thereof shifted toward the most significant position and a control bit (or bits) inserted at the vacant position. The implementation of the bit inserter 84 (86) may be a series of sixteen three-input multiplexers with independent controls, one input for no shift, one input for control bit input and one input for shifted output.

The coefficient address generator 44, has as a key element an array shifter 94 which receives as its input the output of the row counter 70 and the output of the the Motorola Model 10808 Shifter. The shifter 94 is operative to shift the resultant input and to truncate the most significant bits (e.g., shifting the bits off the most significant bit end of the counter) at the radix boundary.

As part of radix-4 coefficient address generation it is necessary to generate a number of different address values for coefficients k. The technique according to the invention is to generate the addresses as multiples of one another. Accordingly, the output of the shifter 94 is first fed through a first line directly to the address gate 50 through output selectors, and it is also fed through a one-bit wired shifter 112 which is operative to multiply the value from the shifter 94 by two. Further, the outputs of the shifter 94 and the wired shifter 112 are coupled to inputs of an adder 110. The output of the adder 110 is a value invariably equal to three times the output value of the shifter 94. The adder 110 and the shift register 112 output are coupled through output selectors to the output gate 50.

In addition, the output of the adder 110 is coupled to a zero detector 114. The zero detector 114 is operative to detect the condition k=0 which in turn is coupled to the k=0 multiplexed output terminal 64 as an output flag.

In order to understand the operation according to the invention of the address selector 36, it is helpful to consider an actual example of row position sequence generation. Assuming that the butterfly counter 40 is capable of generating row positions convertible to addresses for an FFT of up to 64k, operating an eight-point FFT, the column counter 72 is loaded with the value 13 while the row counter 70 is loaded with the value 0. A value corresponding to the transform length is loaded into the latch 46, the output of which constrains the row counter 70 to carry at a preselected count. In the case of the eight-point FFT, the row counter 70 is constrained to carry at 3.

At the beginning of each butterfly operation, the counters are reset and then called upon to generate the seed values from which are generated the selected FFT row positions. The row counter 70 and column counter 72 are incremented with each butterfly operation. The row counter 70 is incremented by the clock line 38 from 0 through 3 whenever Line Enable is active.

The value 0 for example is applied to the data input of the bit inserter 84. The 4-bit output of the column counter 72, which in this case represents a number 13, is applied to the fence decoder 82. The fence decoder 82 generates a 15-bit output which converts the column count to a sequence of zeros and ones, the ones being the most significant bits, wherein the position of the boundary of zeros and ones is determined by the column count. In this case, since the column count is 13, the output of the fence decoder 82 to the control input of the bit inserter 84 comprises thirteen zeros and two ones. The bit inserter 84 is then operative to shift the thirteen most significant data bits received through data line 90 one bit toward the more significant bit end and to insert thereupon the control bit applied from the address selector 59 at the vacant position. The output of the bit inserter 84 is a 16-bit word consisting of the split 15-bit input data word from data line 90 with a control bit (either a one or a zero) inserted at position 2 between the zeros and the ones, or at the third least significant bit. The 16-bit word is then applied to the address gate 50. Other parallel operations are then performed (e.g., selection of related addresses) through the address selector 59 for the current butterfly operation. When the butterfly operation is complete the row counter 70 is incremented by the clock 38 and the cycle repeats itself until the row counter 70 reaches its maximum programmed count, whereupon the carry signal is issued to the column counter 72, and the row counter is reset to zero. The column counter 72 is incremented by one, which in turn increments the control input through the fence decoder 82 by one bit. Thereafter, the control word to the bit inserter 86 consists of one more zero and one less one. The cycle then repeats itself.

The radix-4 bit inserter 86 functions in exactly the same manner, except that some of the data bits received through the data line 19 are shifted two bit places and two bits inserted instead of one under control of the address selector 58 to obtain four different row positions. The radix-4 bit inserter 86 responds to the same output of the fence decoder 82. When the column counter 72 has exhausted its count (counted to fifteen with carry) and the row counter 70 has exhausted its count, the carry output signal is issued to the FFT complete output 60. The next block of data can then be processed upon resetting of the counters.

The coefficient address generator 44 in the radix-2 mode operates as follows: The row counter 70 generates a count, as previously noted. Data is applied through a multiplexer 120 from the row counter 70. (The multiplexer 120 may be provided to allow for wired digit reverse input to the shifter 94 or direct input to the shifter 94, depending on the type of FFT input.) The column counter 72 output is coupled through a multiplexer 120 to the shift input of the shifter 94. Depending on the count out of the column counter 72, the shifter 94 is operative to shift the bits toward the most significant bit by the amount indicated and to truncate at the radix boundary. For example, if the column counter input is 13 for an eight-point array, there is a left shift such that the two LSB are shifted up to the radix. If the column count is 14, there is a left shift of one bit further and truncation. If the column count is 15, there is a 2-bit further left shift and truncation at the radix. In an eight-point array, all but the two most significant bits to the right of the radix are truncated, and all values to the left of the radix (the most significant bits) are also truncated. The output of the shifter 94 in the eight-point FFT is only two bits, plus whatever other bits are subsequently appended to the most significant bit and to specify the desired address. The shifter data word is left shifted to the radix through the shifter 94 at a column count of 13, the data word is left shifted by one more and truncated for a count of 14, and for a count of 15 is left shifted by two more, which results in a zero output. The output of the shifter 94 is applied to the address gate 50 which in turn is coupled to the address output 100.

The invention has now been explained with reference to specific embodiments. Other embodiments will now be apparent to those of ordinary skill in the art. For example, the invention is specifically intended for incorporation into a single compact integrated circuit. Various types of bit inserters, bit shifters and column and row counters can be employed according to the invention. It is therefore not intended that this invention be limited except as indicated by the appended claims.

What is claimed is:

1. For use in a digital signal processor, an intergrated circuit apparatus operative in response to signals from clock means, said clock means establishing a clock cycle, for generating signals representative of nonconsecutive sequence of output position values for data addresses according to a preselected pattern in order to read and write related data of an array in digital memory means, said apparatus comprising:
    first counting means for sequentially generating consecutive signals representing control values;
    second counting means for sequentially generating consecutive signals representing binary seed values;
    means coupled to said first counting means and to said second counting means for inserting at least one preselected binary value signal in a preselected bit position of each seed value signal at each clock signal, said preselected bit place position determined by a control value signal, in order to generate in a nonconsecutive value sequence said output position value signals.

2. The apparatus according to claim 1 wherein said first counting means comprises a first sequential counter having means for presetting an initial column or step count value.

3. The apparatus according to claim 2 wherein said second counting means comprises a second sequential counter having means for presetting an initial row count value, said second counting means also being coupled to an input of said first counting means to provide a signal indicating carry for incrementing said first sequential counter.

4. The apparatus according to claim 1 wherein said inserting means comprises means for shifting a portion of said seed value signal at said preselected bit place position at least one bit place position toward a more significant position.

5. The apparatus according to claim 4 wherein said inserting means comprises means for providing said at least one preselected binary value signal between said shifted portion and unshifted portion of said seed value signal, said preselected bit place position being determined by said control value signal.

6. The apparatus according to claim 5 wherein said inserting means further includes means for converting said control value signal to a binary number signal, said binary number consisting of a sequence of consecutive zeros and a sequence of consecutive ones appended to said consecutive zeros' sequence at a transition point, the number of zeros and the transition point being determined by said control value signal, said transition point defining said preselected bit place position.

7. The apparatus according to claim 5 wherein said inserting means further includes means for selecting the number of bit place positions for shifting said seed value signal portion and the number of binary value signals to be inserted at said preselected bit place position.

8. The apparatus according to claim 4 wherein said inserting means further includes means for converting said control value signal to a binary number signal, said binary number signal consisting of a sequence of consecutive zeros and a sequence of consecutive ones appended to said consecutive zeros at a transition point, the number of zeros and said transition point being determined by said control value signal, said transition point defining said preselected bit place position, and wherein said inserting means further includes means for providing said at least one preselected binary value signal at said preselected bit place position of said seed value signal, said preselected bit place position being determined by said binary number, wherein said control value signal corresponds to a count generated by said first counting means initialized to a value defining a first column position of at least one address in said memory means of a fast Fourier transform array, and wherein a first one of said seed value signals corresponds to a count generated by second counting means initialized to a value defining a first column position of at least one address in said memory means for a fast Fourier transform.

9. The apparatus according to claim 4 further comprising means for shifting the entire portion of said seed value signal positions in a preselected number of bit place positions toward a more significant position, the number of bit place positions of said shift being determined by said control value signal.

10. The apparatus according to claim 9 wherein said entire portion shifting means further includes means for truncating selected most significant bit place positions of said shifted seed value signal.

11. The apparatus according to claim 10 further comprising means coupled to said inserting means and said entire portion shifting means for generating a plurality of said output position values signals.

12. For use in a digital signal processor, an apparatus operative in response to signals from clock means, which establish a clock cycle, for generating signals representative of nonconsecutive output address values, said address values being generated according to a preselected pattern, in order to read and write related data of a multidimensional array in a digital memory means, said apparatus comprising:
  first counting means for sequentially generating consecutive signals representing control values;
  second counting means for sequentially generating consecutive signals representing binary seed values;
  means coupled to said first counting means and to said second counting means for modifying at least one place position signal of each seed value at each clock cycle in response to said control value signals in order to generate a first output position value signal;
  means coupled to said first counting means and to said second counting means for shifting all bits of each seed value by a number of place positions in response to the value of said control value signal at each clock cycle for generating a second output position value signal;
  whereby said first output position value signal and said second outut position value signal correspond to output address values of said memory means.

13. A method for generating a sequence of digital address signals for a fast Fourier transform array processor comprising:
  (a) generating a first binary value in a first digital counting means as a control value;
  (b) generating a second binary value in a second digital counting means as a seed value;
  (c) generating, in response to said control value, a first output position value signal for addressing a digital memory means, said first output position value signal being generated from said seed value by inserting at least one binary bit at a position in said seed value specified by said control value;
  (d) generating, in response to said control value, a second output position value signal for addressing a digital memory means, said second output position value signal being generated from said seed value by shifting said seed value by an amount specified by said control value;
  (e) incrementing in response to a clock signal said first binary value and repeating steps (c) and (d) until said first binary value achieves a first preselected value;
  (f) upon achieving said first preselected value, incrementing in response to a clock signal said second binary value and reinitializing said first counting means to said first binary value; and
  (g) repeating steps (a) through (f) until said second binary value achieves a second preselected value;
  (h) upon achieving said second preselected value, reinitializing said first counting means to said first binary value, reinitializing said second counting means to said second binary value for repeating steps (a) through (g).

* * * * *